C. K. BUTTS.
RAILROAD SPIKE.
APPLICATION FILED JAN. 9, 1908.
933,743.
Patented Sept. 14, 1909.
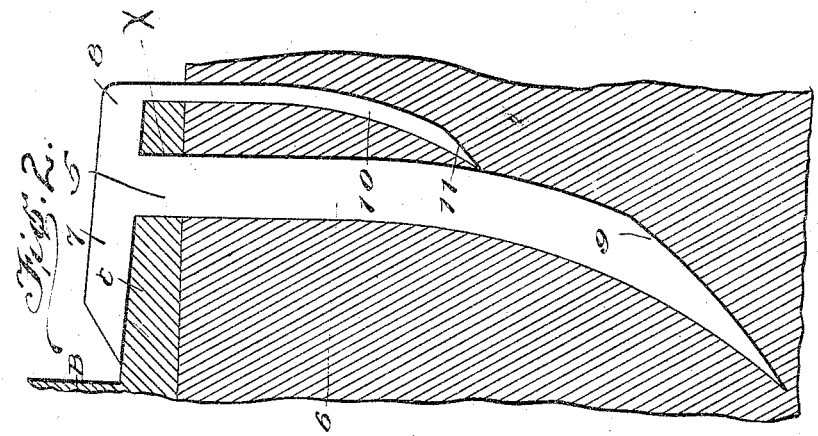
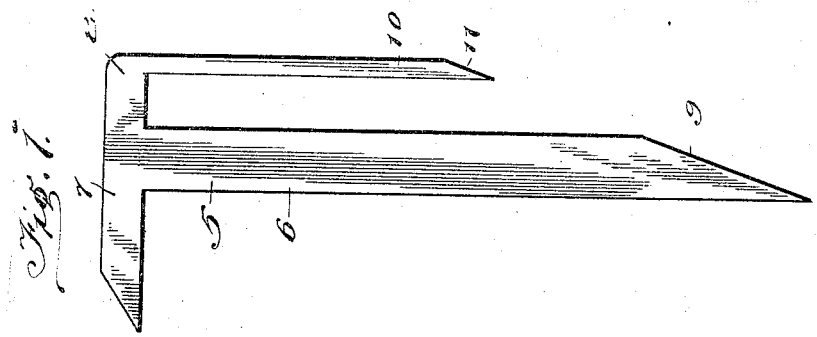
WITNESSES
INVENTOR
Carl K. Butts
Woodward & Chandlee
Attorneys

UNITED STATES PATENT OFFICE.

CARL K. BUTTS, OF CELINA, TEXAS.

RAILROAD-SPIKE.

933,743.  Specification of Letters Patent.  Patented Sept. 14, 1909.

Application filed January 9, 1908. Serial No. 410,035.

*To all whom it may concern:*

Be it known that I, CARL K. BUTTS, a citizen of the United States, residing at Celina, in the county of Collin and State of Texas, have invented certain new and useful Improvements in Railroad-Spikes, of which the following is a specification.

This invention relates to railroads and more particularly to rail fastening means, and has for its object to provide a fastening means of this character including a spike having a main shank and a supplemental shank so arranged that the supplemental shank will be brought into engagement with a portion of the main shank when driven into material, thus anchoring the spike and preventing its disengagement.

In the drawings forming a portion of this specification, and in which like characters of reference indicate similar parts in the several views, Figure 1 is a side elevational view of the present spike, Fig. 2 is a view similar to Fig. 1 showing the application of the spike to the rail.

Referring now more particularly to the drawings, there is shown a spike 5, comprising a main shank 6 headed at its upper end as shown at 7, and this headed portion of the shank is provided with a rearwardly extending portion 8. The lower end of the rear face of the shank 6 is beveled forwardly as shown at 9. The portion 8 of the head 7 is provided with a supplemental shank 10 shorter than the shank 6 arranged initially in parallel relation to the shank 6, and this shank by reason of the portion 8 is spaced from the shank 6, as shown. The lower end of the supplemental shank 10 is beveled in one direction as shown at 11, and this beveled face of the shank is arranged to lie in a common line with the beveled end 9 of the shank 6.

The spike is used in connection with a rail flange C, having an aperture X therein adjacent to its outer edge, the shank 6 is engaged through the aperture X, and the shank 10 extends downwardly over the outer edge of the flange.

When the spike is driven home, the engagement of the bevel face 9 with the material of the tie will cause the shank 6 to bend laterally in the direction of the rail, and the face 11 of the supplemental shank 10, coming into engagement with the material of the tie, will cause this shank 10 to bend in the same direction. By reason of the fact that the shank 10 is thinner than the shank 6, as shown in the drawings, the bending of the shank 10 is more abrupt than that of the shank 6, and consequently the lower end of the shank 10 is brought into engagement with the rearward face of the shank 6, the spike being thus securely locked in the tie.

What is claimed is:

In a rail fastening mechanism, the combination with a plate having a flat under surface and having an aperture formed therethrough adjacent to its rearward edge, of a spike having a shank engaged through the aperture and having a head extending forwardly over the plate, said head having a rearward extension projecting over the portion of the plate between its aperture and its rearward edge, a supplemental shank carried by the rearwardly extending portion of the head of the spike, both of said shanks being beveled at the lower ends of their rearward faces to deflect the shanks in the same direction when driven into a tie, said supplemental shank being of less thickness than the first named shank to promote increased bending of the supplemental shank to bring it into engagement with the first named shank.

In testimony whereof I affix my signature, in presence of two witnesses.

CARL K. BUTTS.

Witnesses:
M. BUTTON,
S. E. BATEMAN.